United States Patent
Yoshida et al.

(10) Patent No.: US 7,212,733 B2
(45) Date of Patent: May 1, 2007

(54) IMAGE SIGNAL PROCESSING DEVICE

(75) Inventors: Ikuhisa Yoshida, Osaka (JP); Hisataka Ueda, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1019 days.

(21) Appl. No.: 10/394,278

(22) Filed: Mar. 24, 2003

(65) Prior Publication Data
US 2003/0210892 A1 Nov. 13, 2003

(30) Foreign Application Priority Data
Mar. 28, 2002 (JP) .......................... P2002-091059

(51) Int. Cl.
*H04N 5/91* (2006.01)
(52) U.S. Cl. .................. 386/131; 386/111; 386/125
(58) Field of Classification Search .............. 386/45, 386/46, 52, 55, 70, 75, 98, 105, 109, 111, 386/125, 129, 131; 375/240.14; 348/97, 348/446
See application file for complete search history.

(56) References Cited

U.S. PATENT DOCUMENTS

| | | | | |
|---|---|---|---|---|
| 4,638,376 A | * | 1/1987 | Sugiyama et al. | 386/70 |
| 5,485,280 A | * | 1/1996 | Fujinami et al. | 386/131 |
| 5,675,379 A | * | 10/1997 | Kato et al. | 386/131 |
| 6,574,423 B1 | * | 6/2003 | Oshima et al. | 386/111 |

* cited by examiner

*Primary Examiner*—James J. Groody
*Assistant Examiner*—Christopher Onuaku
(74) *Attorney, Agent, or Firm*—McDermott Will & Emery LLP

(57) ABSTRACT

A phase standard position signal generator generates a phase standard position signal of a predetermined period indicating the phase standard position of an image signal of 24 frames/second format, for recordation into a recording reproducing medium. In reproducing from the recording reproducing medium, a phase standard position sensor senses the phase standard position signal. A counter performs frequency quintuplication of the phase standard position signal and counts the period of the frequency-quintupled signal. A time code reader reads a 24 Hz time code value from the recording reproducing medium. A time code generator calculates a 30 Hz time code with the use of the counted value given by the counter and the 24 Hz time code value. Thus, the time code of 24 Hz period is converted into the 30 Hz time code with high precision even in variable-speed reproduction.

16 Claims, 14 Drawing Sheets

IMAGE SIGNAL PROCESSING DEVICE

FIELD OF THE INVENTION

The present invention relates to an image signal processing device. More particularly, the present invention relates to a technique of converting into and generating a 30 Hz time code corresponding to an interlace television image signal or the like from a 24 Hz time code corresponding to an image signal constituted with images of 24 frames per one second of a movie film or the like.

BACKGROUND OF THE INVENTION

In movies or the like, a progressive-form image signal made of successive images of 24 frames per one second is used. On the other hand, in television image signals, an image signal made of successive images of 30 frames/second format is often used. In television image signals, both a progressive form and an interlace form are used.

The 2-3 pulldown conversion method is known in the art as a technique for converting a progressive image signal of 24 frames/second format (hereinafter referred to as 24 progressive signal) into an image signal of 30 frames/second format.

Hereinafter, a conversion process using the 2-3 pulldown conversion method will be described with reference to FIG. 14. Here, as one example thereof, a process of converting a 24 progressive signal into an interlace-form image signal of 30 frames/second format (hereinafter referred to as 30 interlace signal) will be described.

First, referring to FIG. 14(a), frame images of a 24 progressive signal located at the first image position (frame A) are subjected to a conversion process by being allotted to two field images of a 30 interlace signal at the first image position (the first field images F1, F2), as shown in FIG. 14(b). Further, frame images of the 24 progressive signal located at the next image position (as viewed from the first image position) (frame B) are subjected to a conversion process by being allotted to three field images located at the next position of the 30 interlace signal (the next field images F1, F2, F1).

Such a conversion process is repeated every 1/12 second, thereby two frames of the 24 progressive signal (images for 2/24 seconds) are arranged to correspond to five fields of the 30 interlace signal (images for 5/60 seconds). Then, a conversion process including this corresponding process as one sequence is repeatedly executed. Hereinafter, an image signal obtained by such a conversion process will be referred to as a 2-3 pulldown interlace signal.

A general signal form used for editing work or the like is a 30 interlace signal. However, the time code used in reproducing and outputting from a recording reproducing medium having a 24 progressive signal recorded thereon (hereinafter referred to as 24-time code) cannot be used in an image process of a system that uses a 30 interlace signal. For this reason, in carrying out the 2-3 pulldown conversion process, the following process becomes essential. Namely, a 24-time code is extracted from a recording reproducing medium having a 24 progressive signal recorded thereon. The extracted 24-time code is then converted into a time code used in reproducing and outputting from a recording medium having a 30 interlace signal recorded thereon (hereinafter referred to as 30-time code).

In the meantime, a technique of generating and outputting a 30-time code in ordinary reproduction of a 2-3 pulldown interlace signal is known in the art. However, in a system that involves variable-speed reproduction, one cannot output a 30-time code ceaselessly and accurately in correspondence with a 24-time code that is output by variable-speed reproduction from a recording reproducing medium having a 24 progressive signal recorded thereon. For this reason, the system construction will be difficult.

SUMMARY OF THE INVENTION

Therefore, a principal object of the present invention is to make it possible to generate and output an accurate 30-time code corresponding to a reproduced 24-time code invariable-speed reproduction from a recording reproducing medium having an image signal of 24 frames/second format recorded thereon.

In order to achieve the aforementioned object of the present invention, the present invention is constructed as follows in an image signal processing device for generating and outputting a 30 Hz time code corresponding to an image signal of 30 frames/second format from a 24 Hz time code corresponding to an image signal of 24 frames/second format in reproducing the image signal from a recording reproducing medium having the image signal of 24 frames/second format recorded thereon.

The image signal processing device of the present invention includes a phase standard position signal generator for generating a phase standard position signal of a predetermined period indicating a phase standard position of the image signal; a recorder for recording the phase standard position signal into the recording reproducing medium; a reproducer for reproducing the phase standard position signal from the recording reproducing medium; a phase standard position sensor for sensing the phase standard position of the reproduced image signal on the basis of the phase standard position signal reproduced from the recording reproducing medium; a counter for performing frequency multiplication of the phase standard position signal reproduced from the recording reproducing medium with the use of the phase standard position sensed by the phase standard position sensor as a base point, and for counting a period of the frequency-multiplied signal; a time code reader for reading the 24 Hz time code recorded in the recording reproducing medium; and a time code generator for generating the 30 Hz time code on the basis of a counted value given by the counter and a 24 Hz time code value read by the time code reader.

The present invention operates as follows. In variable-speed reproduction of the image signal from a recording reproducing medium having an image signal of 24 frames/second format recorded thereon, the period of the phase standard position signal changes in accordance with the change in the reproduction speed. However, even in that case, there will be no change in the relative positional relationship between the frame period of the image signal of 24 frames/second format (specifically, 4-frame period) and the frame period of the image signal of 30 frames/second format (specifically, 5-frame period) Paying attention to this point, the phase standard position signal generator generates a phase standard position signal of a predetermined period indicating the phase standard position of the image signal. Here, the predetermined period set in the phase standard position signal is specifically a period corresponding to the frame period of the image signal of 30 frames/second format.

By setting the phase standard position signal in such a manner, the period of the phase standard position signal will be synchronized with the frame period of the image signal of 24 frames/second format even during the variable-speed reproduction. Similarly, a frequency-multiplied signal generated by frequency multiplication of the phase standard position signal will be synchronized with the frame period of the image signal of 24 frames/second format even during the variable-speed reproduction.

For this reason, the standard position of the image signal of 24 frames/second format sensed by the phase standard position sensor on the basis of the phase standard position signal will be a highly precise one.

Therefore, the 30 Hz time code generated on the basis of the counted value of the frequency-multiplied signal counted on the basis of the sensed phase standard position and the 24 Hz time code value will be highly accurate. Moreover, the precision will be maintained to be high even in variable-speed reproduction.

A preferable example of the present invention is as follows. Namely, the image signal of 30 frames/second format is obtained by 2-3 pulldown conversion of the image signal of 24 frames/second format; the predetermined period is a four-frame period of the image signal of 24 frames/second format; and the frequency-multiplied signal is a signal obtained by performing frequency quintuplication of the phase standard position signal reproduced from the recording reproducing medium.

This construction allows that, in variable-speed reproduction, though the period of the phase standard position signal changes in accordance with the change in the reproduction speed, the four-frame period of the image signal of 24 frames/second format remains unchanged. For this reason, the phase standard position of the image signal of 24 frames/second format can be accurately sensed. Further, in such a format conversion relationship, the frequency-quintupled signal obtained by frequency quintuplication of the phase standard position signal will be a signal having one frame of the image signal of 30 frames/second format as a period.

For this reason, the 30 Hz time code generated on the basis of the counted value of the frequency-multiplied signal counted on the basis of the sensed phase standard position and the 24 Hz time code value will be highly precise. Moreover, the accuracy will be maintained to be high even in variable-speed reproduction.

Another preferable example of the present invention is as follows. Namely, the phase standard position sensor further has a function of adjusting a phase of the phase standard position signal itself; and this phase adjustment function is a function of specifying the phase standard position of the reproduced image signal of 24 frames/second format by being performed on the basis of a selection operation of a user.

This allows that, if the phase standard position sensed on the basis of the phase standard position signal is shifted from the 2-3 pulldown phase standard position set by a user for 2-3 pulldown conversion, the phase standard position can be determined by being changed to a phase standard position designated by a selection operation performed by the user.

BRIEF DESCRIPTION OF THE DRAWINGS

Other objects of the present invention will become apparent from the following detailed description of the embodiments, and will be manifested in the appended claims. Further, by carrying out the present invention, those skilled in the art will be reminded of the numerous advantages that have not been touched upon in this specification.

DETAILED DESCRIPTION OF THE INVENTION

Hereinafter, preferable embodiments of the present invention will be described with reference to the attached drawings.

Figure 1:
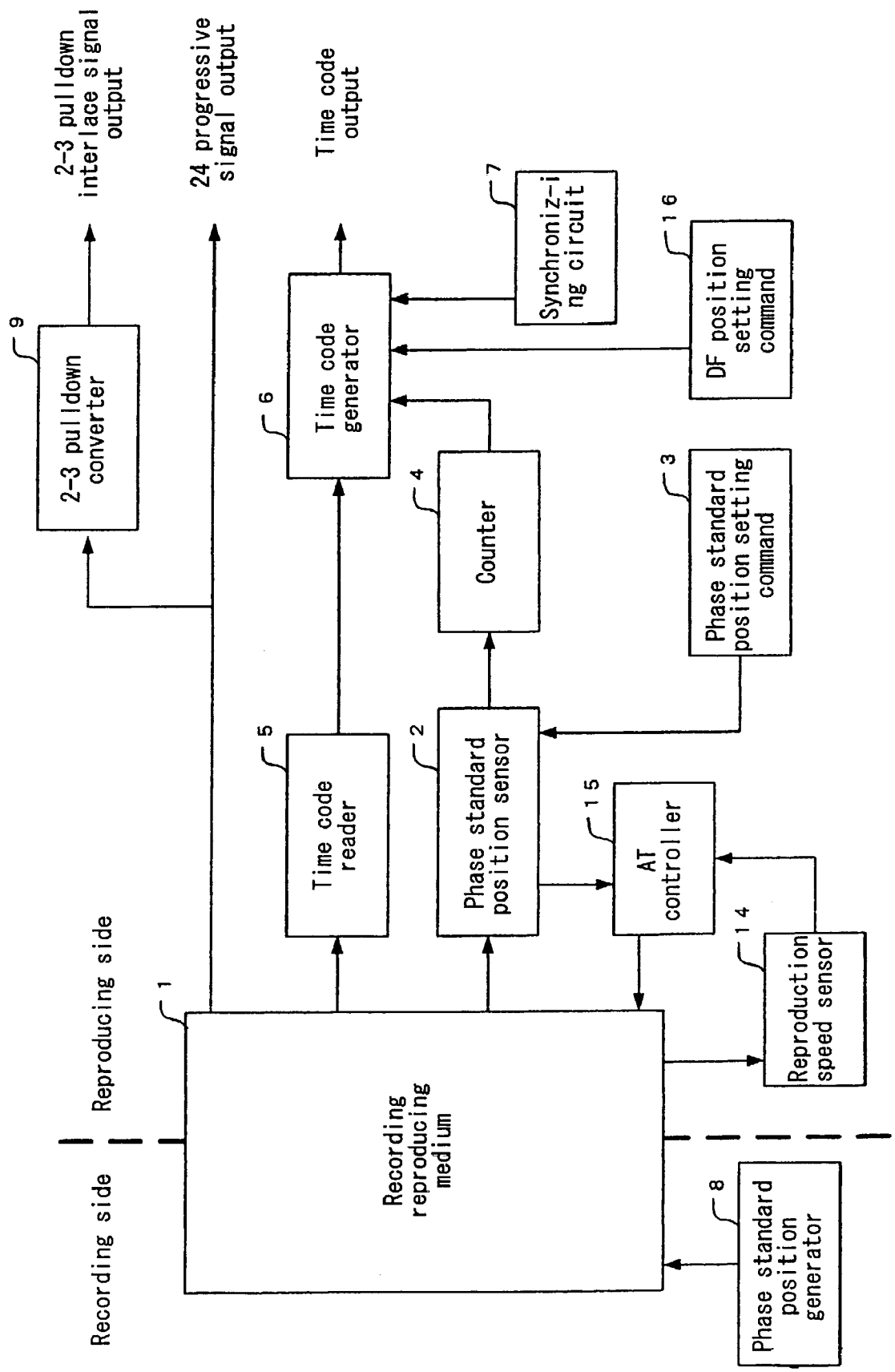
FIG. 1 is a block diagram illustrating an overall construction of a preferable embodiment of the present invention.

FIG. 1 is a block diagram illustrating an overall construction of an image signal processing device according to an embodiment of the present invention.

This image signal processing device includes a recording-side functional element group and a reproducing-side functional element group. The recording-side functional element group exhibits a function of recording an image signal into a recording reproducing medium 1 such as a magnetic tape. Specifically described, the recording-side functional element group is a functional element group that records a 24 progressive signal (a progressive-form image signal of 24 frames/second format). The reproducing-side functional element group exhibits a function of performing ordinary reproduction and variable-speed reproduction of a 24 progressive signal recorded on the recording reproducing medium 1. In FIG. 1, the components are described by being classified into recording-side and reproducing-side with a broken line used as a boundary.

The recording-side functional element group includes a known recording functional element group (not illustrated) and a phase standard position signal generator 8. From a 24 progressive signal recorded on the recording reproducing medium 1, the phase standard position signal generator 8 generates a 24 progressive phase standard position signal indicating the phase standard position of the 24 progressive signal. The 24 progressive phase standard position signal generated by the phase standard position signal generator 8 is recorded into the recording reproducing medium 1 via a control head 11. The recordation of the 24 progressive phase standard position signal is carried out simultaneously with the recordation of the 24 progressive signal into the recording reproducing medium 1 by a rotative head 13.

In addition to a known reproducing functional element group (not illustrated), the reproducing-side functional element group includes a phase standard position sensor 2, a counter 4, a time code reader 5, a time code generator 6, a synchronizing circuit 7, a reproduction speed sensor 14, an auto tracking controller (hereinafter referred to as AT controller) 15, and a 2-3 pulldown converter 9.

In ordinary or variable-speed reproduction from the recording reproducing medium 1, the phase standard position sensor 2 senses the phase standard position of the reproduced 24 progressive signal from the 24 progressive phase standard position signal. On the basis of the 24 progressive phase standard position signal, the counter 4 performs frequency quintuplication of the 24 progressive phase standard position signal with the use of the phase standard position as a base point, and counts the period of the frequency-quintuplicated signal. The time code reader 5 reads the 24-time code recorded on the recording reproducing medium 1. The time code generator 6 calculates and outputs a 30-time code corresponding to the 24-time code on the basis of the 24-time code value, the counted value given by the counter 4, and the output of the synchronizing circuit 7. The reproduction speed sensor 14 senses the reproduction speed of the recording reproducing medium 1. The AT controller 15 controls the signal reading position of the rotative head 13 on the basis of the sensed information given by the reproduction speed sensor 14 and the phase standard position sensor 2. The 2-3 pulldown converter 9 converts the 24 progressive signal into a 30 interlace signal by 2-3 pulldown conversion.

Figure 2:
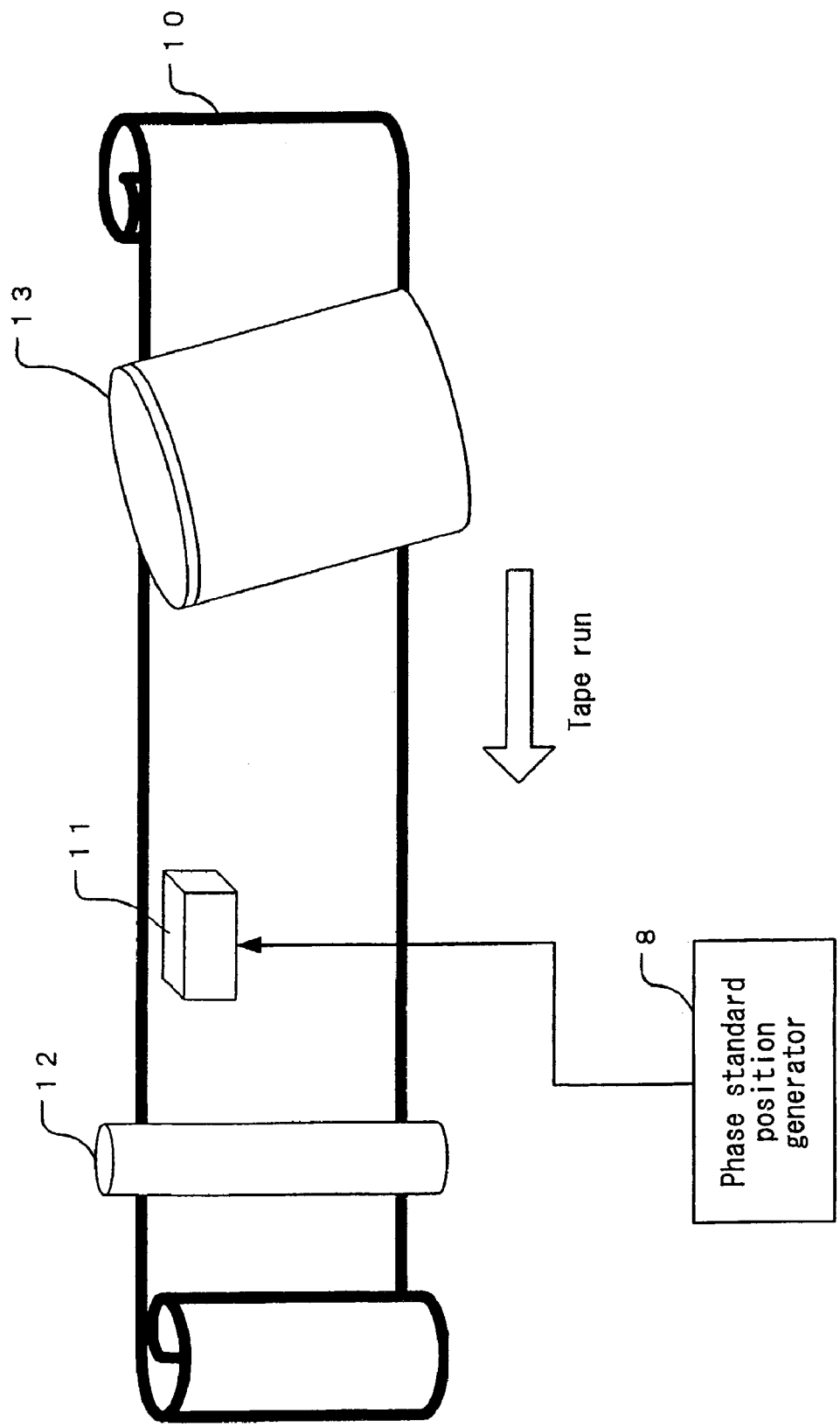
FIG. 2 is a view illustrating a construction of recordation of a phase standard position signal in the embodiment.

The mutual relationship among the recording reproducing medium 1, the phase standard position signal generator 8, the control head 11, the capstan roller 12, and the rotative head 13 is shown in FIG. 2.

In this image signal processing device, the recorder and the reproducer of an image signal is constituted with the capstan roller 12 and the rotative head 13. The recorder and the reproducer of the 24 progressive phase standard position signal are constituted with the control head 11 and the capstan roller 12. The reproducer of the image signal and the reproducer of the 24 progressive phase standard position signal constructed in this manner are constructed to be capable of variable speed reproduction. Further, in variable-speed reproduction of the image signal, the reproducer of the 24 progressive phase standard position signal reproduces the 24 progressive phase standard position signal at the same reproduction speed as the variable-reproduction speed thereof.

Figure 3:
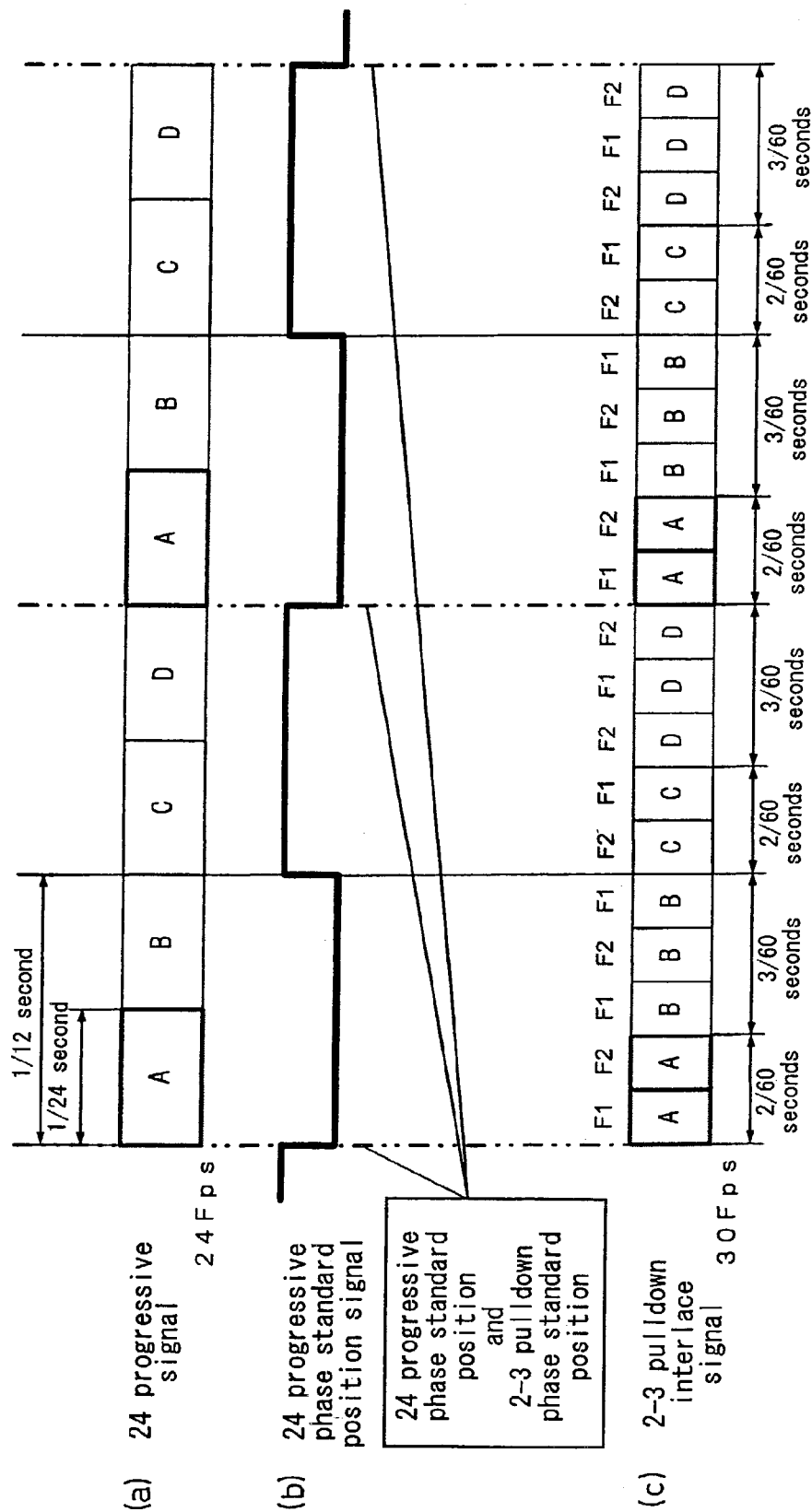
FIG. 3 is a view illustrating an example of a phase standard position signal in the embodiment.

Hereinafter, an operation of this image signal processing device will be described. First, a recording operation will be described. On the basis of the 24 progressive signal shown in FIG. 3(a), the phase standard position signal generator 8 generates a 24 progressive phase standard position signal having four frames of this 24 progressive signal as one period. The 24 progressive phase standard position signal is shown in FIG. 3b. The 24 progressive phase standard position signal is recorded into the recording reproducing medium 1 by the control head 11.

FIG. 3(c) shows a 2-3 pulldown interlace signal generated by 2-3 pulldown conversion of the 24 progressive signal of FIG. 3(a).

The 24 progressive phase standard position signal is a signal of 4-frame period of the 24 progressive signal. The 24 progressive phase standard position signal is a signal that is synchronized with the phase standard position of the 24 progressive signal. Here, the phase standard position of the 2-3 pulldown interlace signal generated by a later-described 2-3 pulldown process is at the same position as the phase standard position of the 24 progressive signal. For this reason, the 24 progressive phase standard position signal is also synchronized with the phase standard position of the 2-3 pulldown interlace signal. Here, though the synchronizing position of the 24 progressive phase standard position signal in FIGS. 3(a) to 3(c) is at the falling edge position thereof, the synchronizing position may be at the rising edge position thereof.

It suffices if the 24 progressive phase standard position signal can differentiate the phase standard position of the 24 progressive signal, so that the 24 progressive phase standard position signal is not limited to the above-described mode alone. For example, the 24 progressive phase standard position signal maybe a pulse that is coincident with the phase standard position of the 24 progressive signal or the like.

The 24 progressive phase standard position signal is recorded into the recording reproducing medium 1 by control head 11. The 24 progressive signal is recorded into a magnetic tape 10 by the rotative head 13. At this moment, the 24 progressive phase standard position signal and the 24 progressive signal are recorded with the phase standard positions thereof having the same phase.

Figure 4:
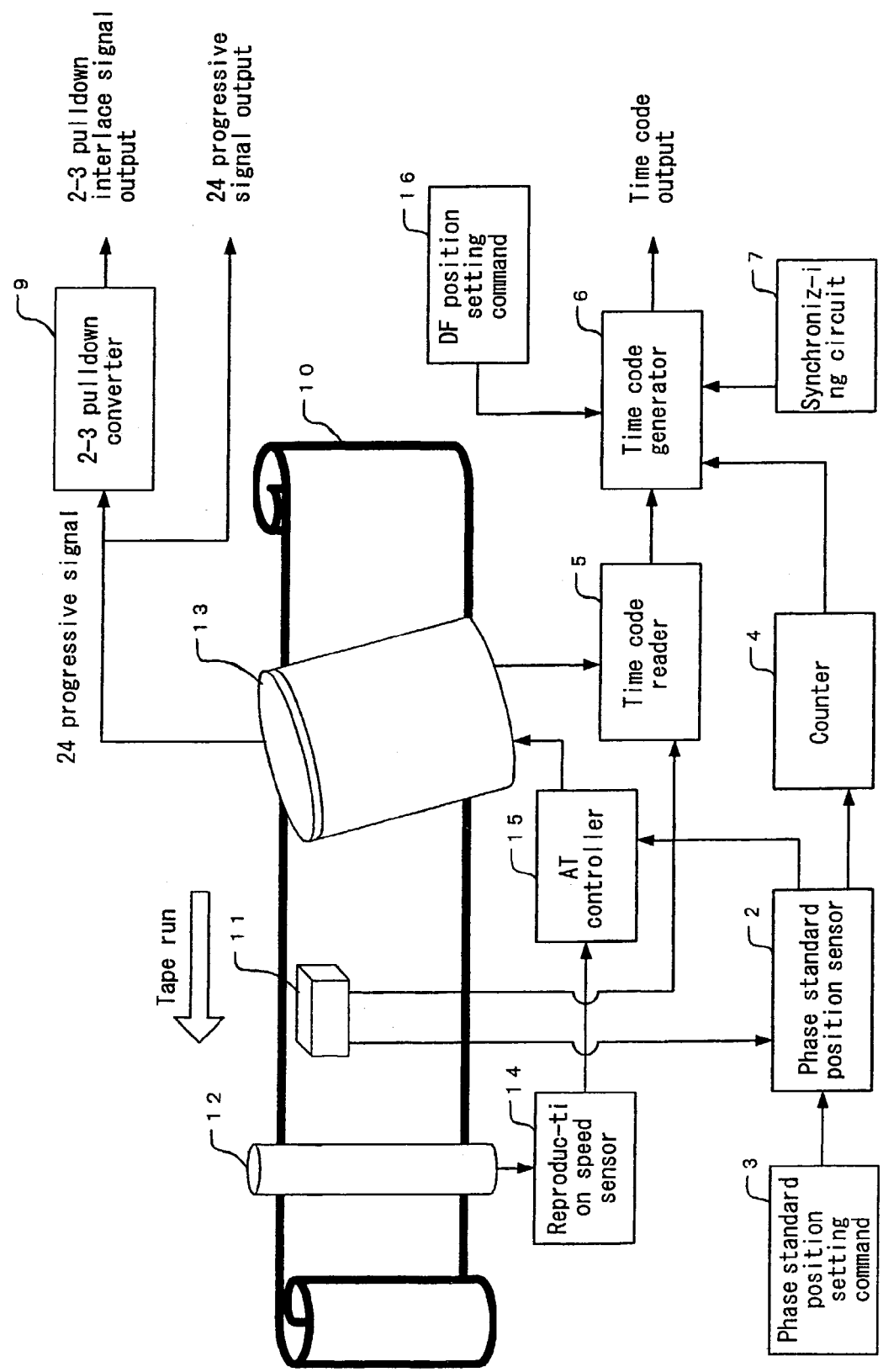
FIG. 4 is a view illustrating a construction of generation of a 30-time code from a 24-time code in the embodiment.

Next, a reproduction operation will be described. FIG. 4 is a construction view for describing an operation of reading the 24-time code, an operation of sensing the phase standard position of the 24 progressive phase standard position signal, and an operation of generating the 30-time code by the reproducing-side functional element group. In FIG. 4, parts corresponding to those in FIGS. 1 and 2 are denoted with the same reference symbols as in FIG. 1.

The 24-time code is readout from the recording reproducing medium 1 by the control head 11. The electric signal of the read-out 24-time code is coded by the time code reader 5.

The 24 progressive phase standard position signal is read out from the recording reproducing medium 1 by the control head 11. The phase standard position sensor 2 senses the 24 progressive phase standard position from the read-out 24 progressive phase standard position signal.

Here, the operation of reading the 24-time code and the 24 progressive phase standard position signal from the recording reproducing medium 1 can be carried out in the following manner. Namely, the reproduction speed sensor 14 senses information on the reproduction speed of the capstan roller 12. Further, the phase standard position sensor 2 senses information on the 24 progressive phase standard position of the 24 progressive phase standard position signal. Then, on the basis of the reproduction speed information and the 24 progressive phase standard position information, The AT controller 15 controls the reading positions of the control head 11 and the rotative head 13. In this state, the control head 11 reads the electric signals of the 24-time code and the 24 progressive phase standard position signal from the recording reproducing medium 1.

Figure 5:
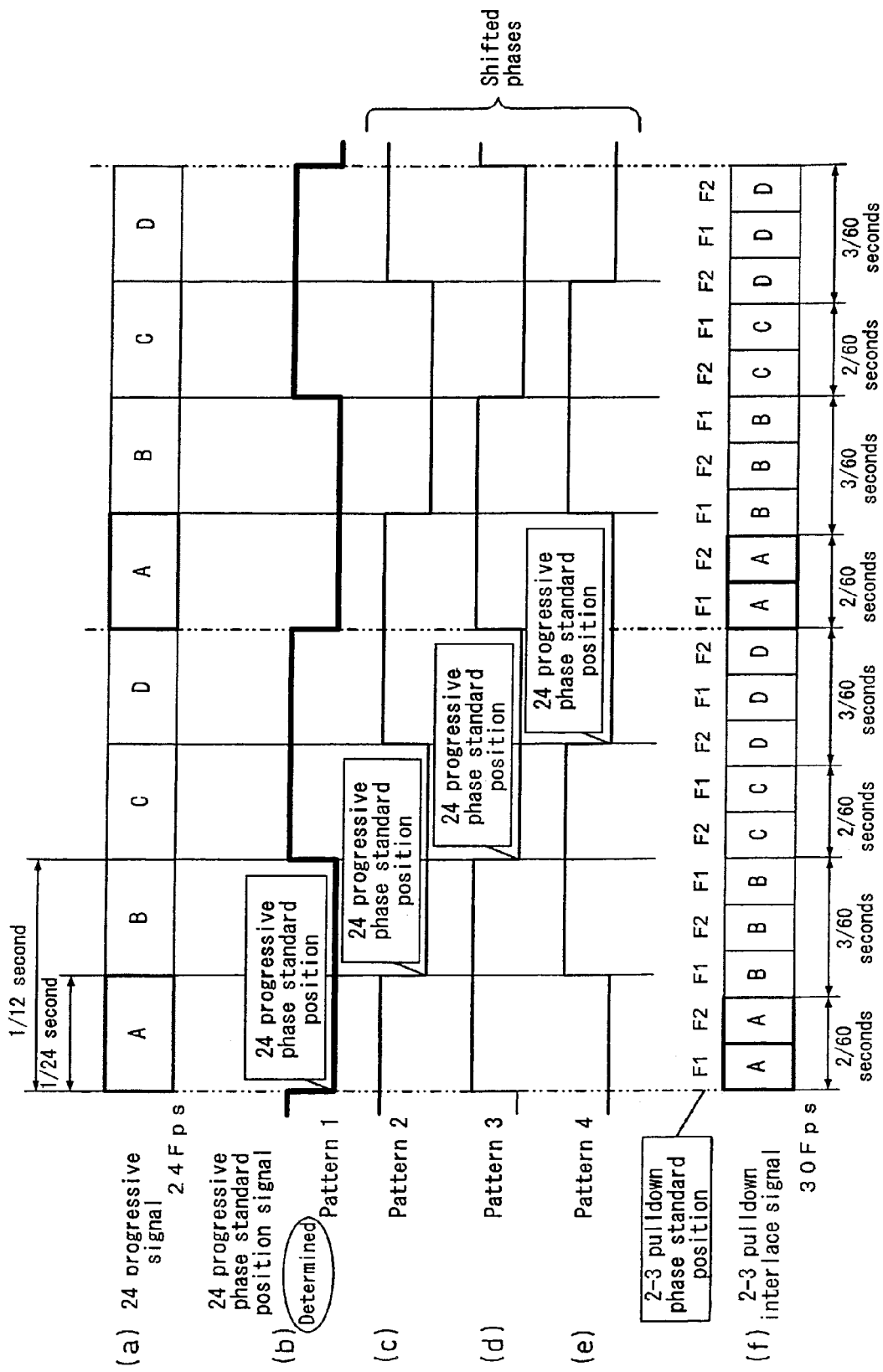
FIG. 5 is a view for describing a method of determining a phase standard position in the embodiment.

In this image signal processing device, a 2-3 pulldown interlace signal shown in FIG. 5(f) is generated from the 24 progressive signal shown in FIG. 5(a). The phase of the generated 2-3 pulldown interlace signal is set in accordance with the phase standard position of the 24 progressive phase standard position signal.

The 24 progressive phase standard position signal has four kinds of phase patterns (pattern 1 to pattern 4) shown in FIGS. 5(b) to 5(e) with respect to the 24 progressive signal. For this reason, there are cases in which the actual reproduced 2-3 pulldown phase standard position is shifted from the reproduced 2-3 pulldown phase standard position that the user wishes to set. As a measure to deal with this problem, the following processes are carried out in this image signal processing device.

The image signal processing device has an input device (for example, a setting button that is not illustrated) for inputting a phase standard position setting command 3 for selecting any one of the above-described four kinds of phase pattern 1 to pattern 4. By operating the aforethe setting button while looking at a screen of reproducing the 2-3 pulldown interlace signal that has undergone the 2-3 pulldown conversion process, the user inputs which of the phase patterns of pattern 1 to pattern 4 is to be selected. The input selected phase pattern is input into the phase standard position sensor 2 as the phase standard position setting command 3. The phase standard position sensor 2 corrects the phase pattern of the sensed 24 progressive phase standard position signal so that the phase pattern may accord to the phase pattern set in the phase standard position setting command 3.

By repeating the reproduction and correction operations described above, the user can regenerate a 24-time code in a state in which the 2-3 pulldown phase standard position accords to the 24 progressive phase standard position.

Here, invariable-speed reproduction of the 24 progressive image signal from the recording reproducing medium 1, the period of the 24 progressive phase standard position signal changes in accordance with the change in reproduction speed. However, even in this case, there will be no change in the relative positional relationship between the frame period of the 24 progressive image signal (specifically, four-frame period) and the frame period of the 30 interlace image signal (specifically, five-frame period). For this reason, even during the variable-speed reproduction, the period of the 24 progressive phase standard position signal is synchronized with the frame period of the 24 progressive image signal. Similarly, even during the variable-speed reproduction, the frequency-multiplied signal generated by frequency multiplication of the 24 progressive phase standard position signal is synchronized with the frame period of the 24 progressive image signal.

Therefore, the standard position of the 24 progressive image signal that the phase standard position sensor 2 senses on the basis of the 24 progressive phase standard position signal will have a high precision. For this reason, the 30 Hz time code generated on the basis of the counted value of the frequency-multiplied signal counted by the counter 4 and the 24 Hz time code value sensed by the 24 time code reader 5 will have a high precision. Moreover, even during the variable-speed reproduction, the precision will be maintained to be high.

Hereinafter, an operation of the counter 4 and the time code generator 6 in variable-speed reproduction (N-fold-speed reproduction) will be described with reference to FIGS. 6(a) to 6(f).

Figure 6:
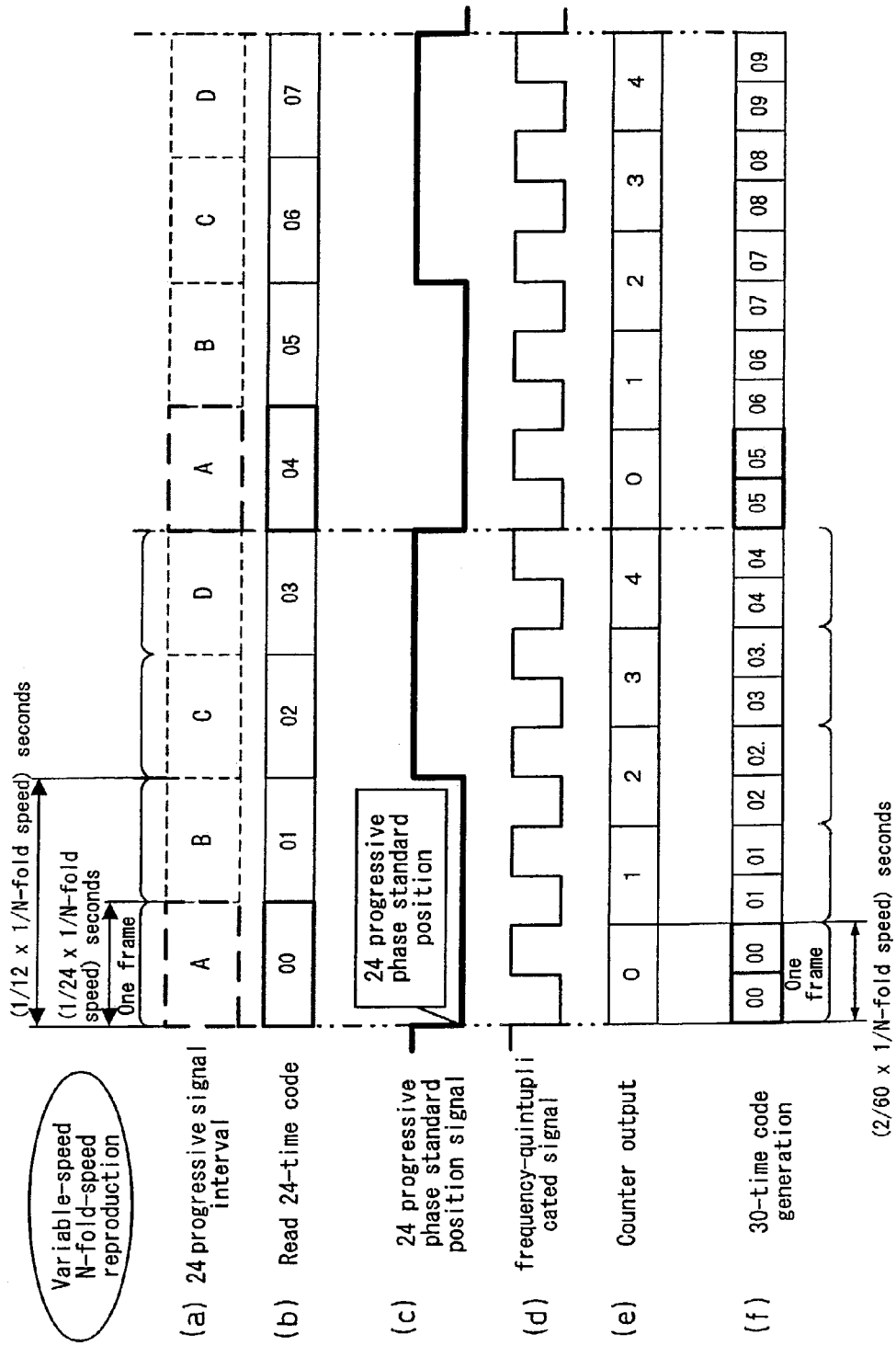
FIG. 6 is a view for describing generation of a 30-time code in the embodiment.

FIG. 6(a) shows a 24 progressive signal that is subjected to variable-speed reproduction. FIG. 6(b) shows a 24-time code read by the time code reader 5. FIG. 6(c) shows a reproduced 24 progressive phase standard position signal. FIG. 6(d) shows a frequency-quintupled signal obtained by frequency quintuplication of the 24 progressive phase standard position signal. FIG. 6(e) shows a counted value given by the counter 4. FIG. 6(f) shows a 30-time code generated by the time code generator 6.

Counter 4 performs frequency quintuplication of the 24 progressive phase standard position signal. Furthermore, the counter 4 counts the period of the frequency-quintupled signal generated by frequency-multiplication from 0 to 4 with the use of the 24 progressive phase standard position as a base point. The counter 4 repeatedly executes the counting process from 0 to 4.

The time code generator 6 reads a 24-time code value at the time point which is the 24 progressive phase standard position and at which the counted value of the counter 4 is "0". The time code generator 6 converts the read 24-time code into a 30-time code corresponding to the 24-time code.

In each of FIGS. 6a to 6f, the 24-time code value is "00" at the time point which is the 24 progressive phase standard position and at which the counted value of counter 4 is "0", as shown in FIG. 6(b). Therefore, the 30-time code corresponding to this time code value "00" will be "00".

The 30-time codes on the time axis corresponding to the counted values "1", "2", "3", "4" of the counter 4 thereafter are incremented one by one from the value of the above-described "0" value. The 30-time codes thus successively determined are output in accordance with an output synchronization signal from the synchronizing circuit 7.

Further, in the process of preparing a 2-3 pulldown interlace signal from the 24 progressive signal, the time code generator 6 performs the following process in order to provide correspondence to the read 24-time code. Namely, the time code generator 6 generates a 30-time code in accordance with one of the phase 1 shown in (a-1) to (a-3) of FIG. 7A, the phase 2 shown in (b-1) to (b-3) of FIG. 7B, the phase 3 shown in (c-1) to (c-3) of FIG. 7C, and the phase 4 shown in (d-1) to (d-3) of FIG. 7D.

Here, (a-1), (b-1), (c-1), and (d-1) show 24-time codes read by the 24 time code reader 5 in phases 1 to 4, respectively. (a-2), (b-2), (c-2), and (d-2) show counted values of the counter 4 in phases 1 to 4, respectively. (a-3), (b-3), (c-3), and (d-3) show 30-time codes generated by the time code generator 6 in phases 1 to 4, respectively.

If the generated 30-time code has a non-drop-frame period (hereinafter referred to as "NDF"), the generated value of the 30-time code value is changed depending on which of "00", "01", "02", and "03" the phase of the 24-time code value is at when the counted value of the counter 4 is at the "0" position.

Figure 7:
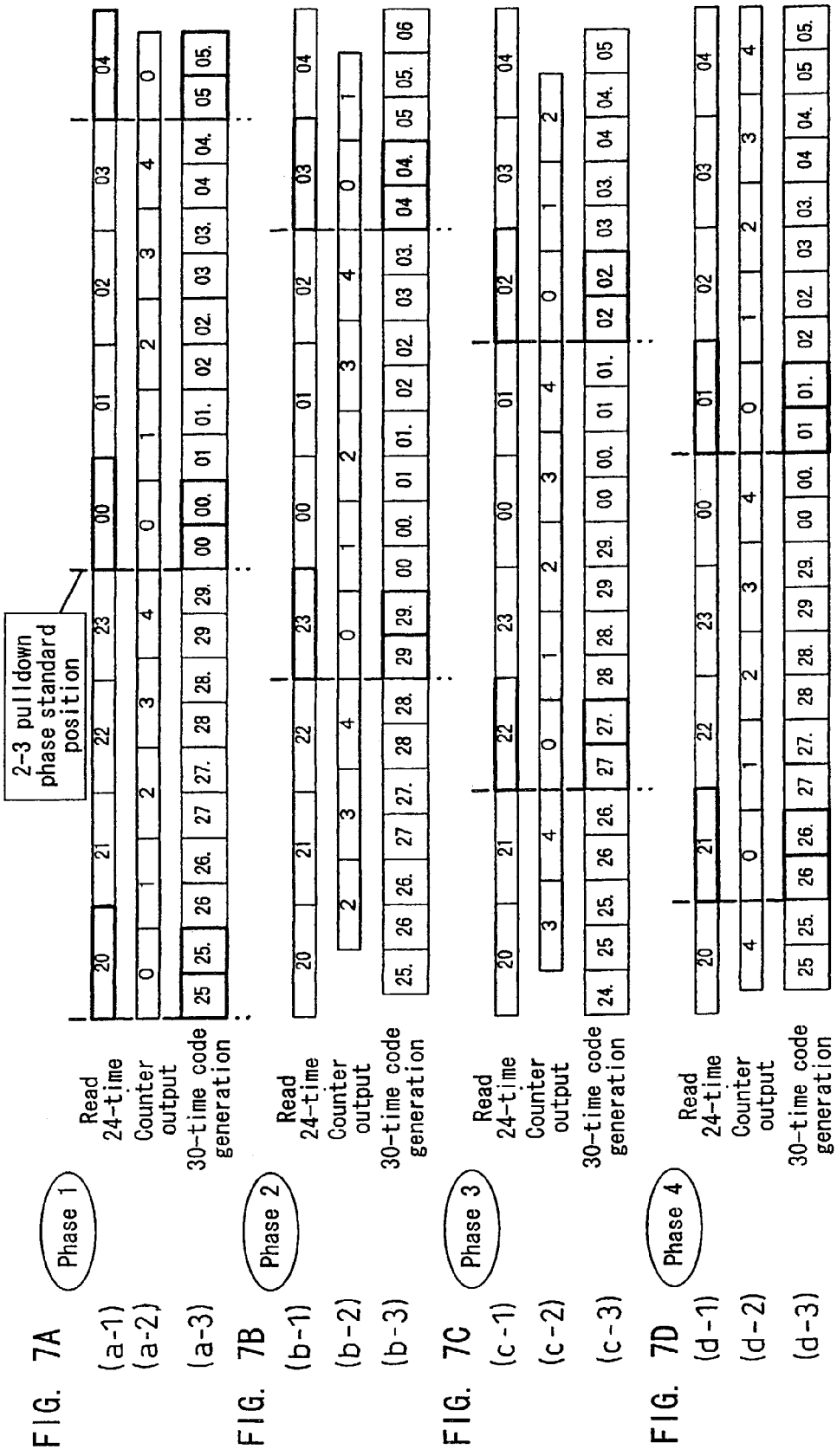
FIG. 7A is a view for describing the presence of phase 1 in generating a 30-time code in the embodiment.
FIG. 7B is a view for describing the presence of phase 2 in generating a 30-time code in the embodiment.
FIG. 7C is a view for describing the presence of phase 3 in generating a 30-time code in the embodiment.
FIG. 7D is a view for describing the presence of phase 4 in generating a 30-time code in the embodiment.

In phase 1 shown by (a-1) to (a-3) of FIG. 7A, the 24-time code value is "00" when the counted value of the counter 4 is "0", so that the corresponding 30-time code will be "00". In phase 2 shown by (b-1) to (b-3) of FIG. 7B, the 24-time code value is "03" when the counted value of the counter 4 is "0", so that the corresponding 30-time code will be "04". In phase 3 shown by (c-1) to (c-3) of FIG. 7C, the 24-time code value is "02" when the counted value of the counter 4 is "0", so that the corresponding 30-time code will be "02". In phase 4 shown by (d-1) to (d-3) of FIG. 7D, the 24-time code value is "01" when the counted value of the counter 4 is "0", so that the corresponding 30-time code will be "01".

Thereafter, the 30-time code value is calculated for every count of the counter 4 because a predetermined correspondence is attained between the frame count numbers 0 to 23 of the 24-time code and the frame count numbers 0 to 29 of the 30-time code, as described above.

Further, if an arbitrary time code value serving as a base point in converting the 24-time code into a 30-time code and a phase of the 24 progressive phase standard position signal at the aforethe base point are set by an input operation performed by the user, one can determine an arbitrary 30-time code corresponding to the 24-time code by calculation.

Figure 8:
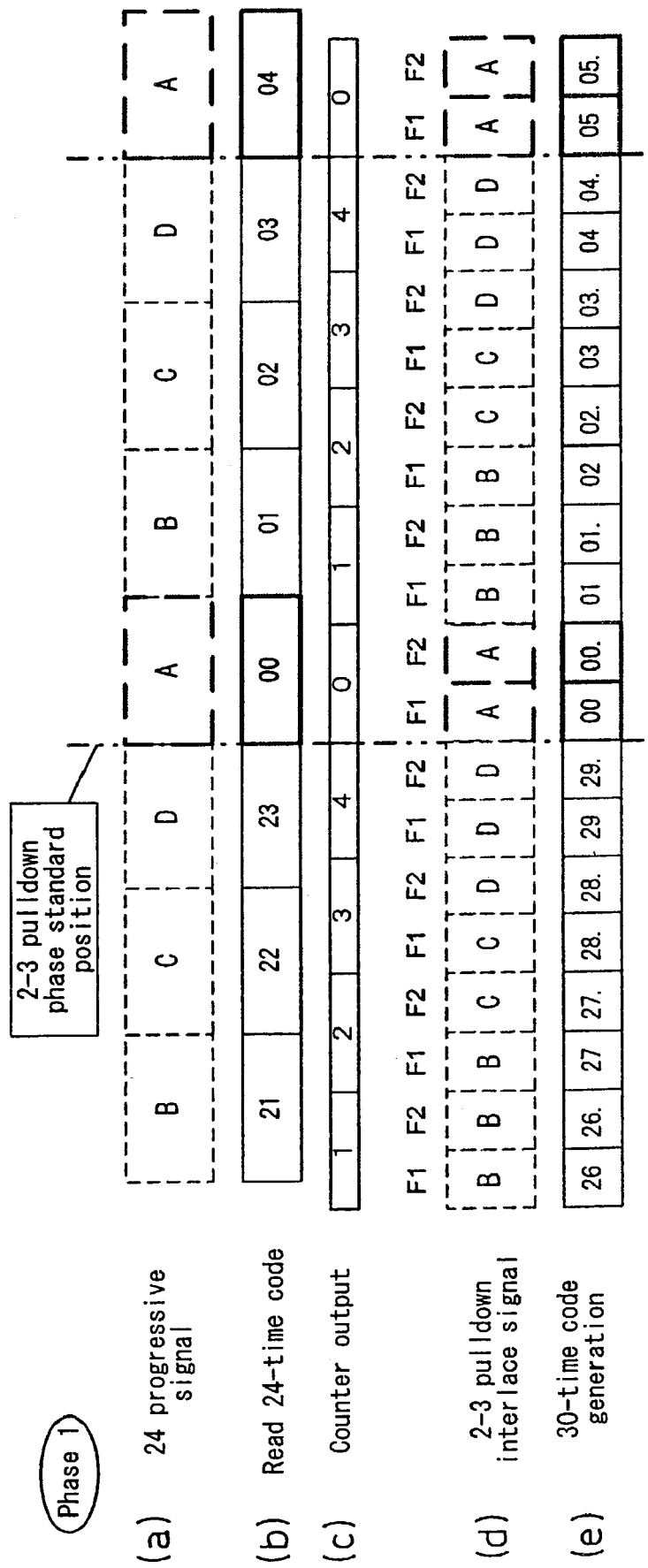
FIG. 8 is a view for describing phase 1 in generating a 30-time code in the embodiment.
Figure 9:
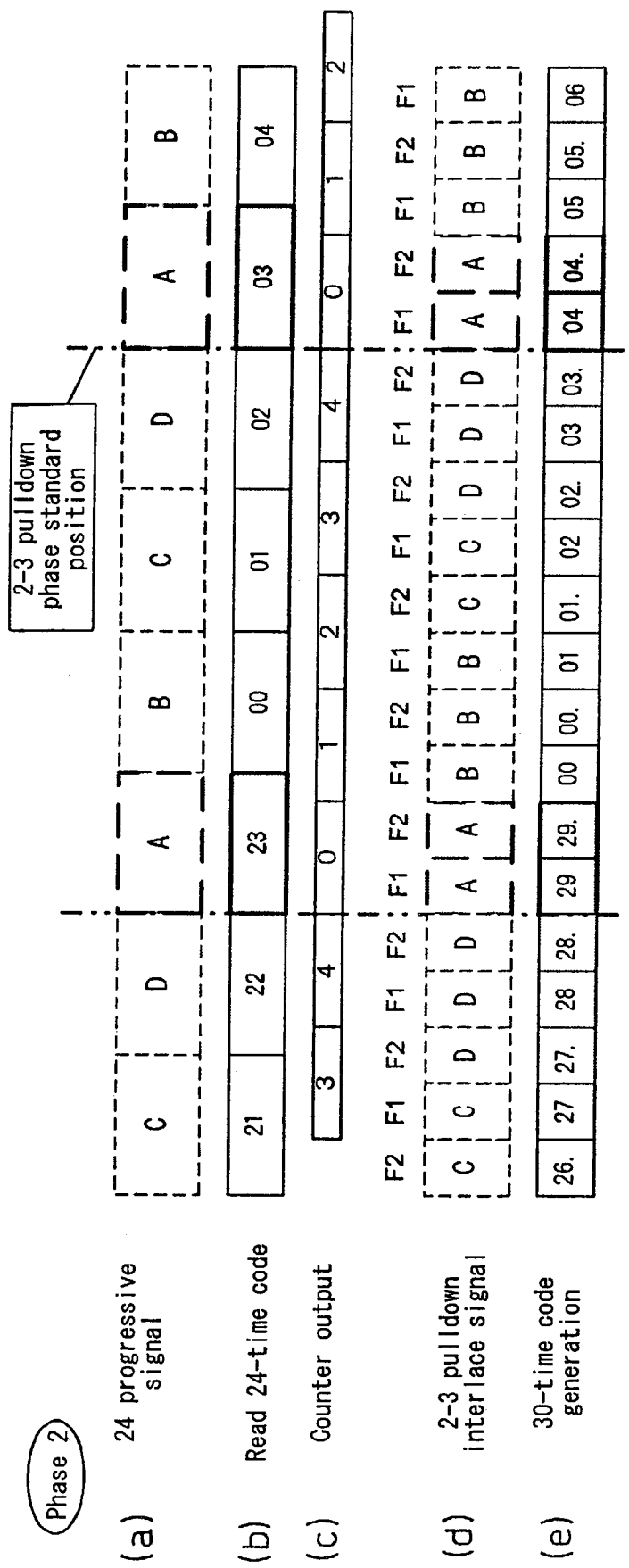
FIG. 9 is a view for describing phase 2 in generating a 30-time code in the embodiment.
Figure 10:
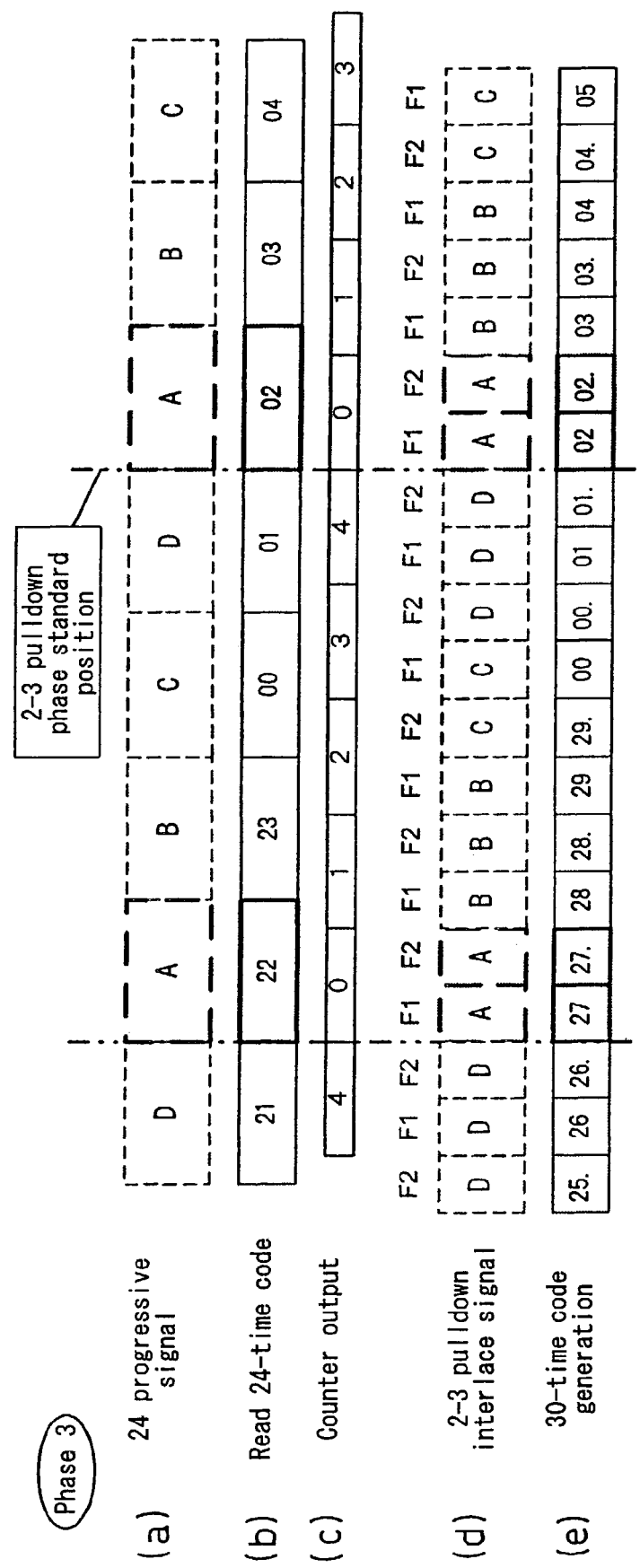
FIG. 10 is a view for describing phase 3 in generating a 30-time code in the embodiment.
Figure 11:
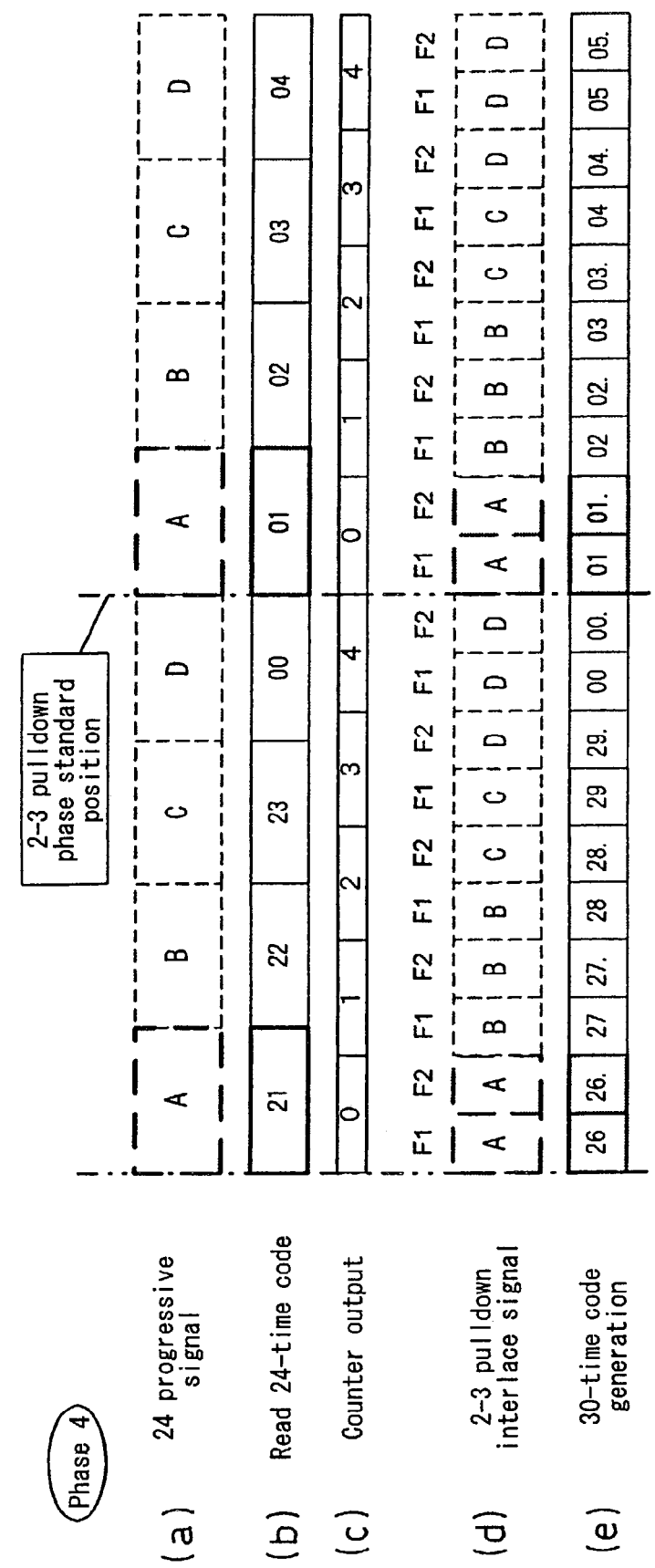
FIG. 11 is a view for describing phase 4 in generating a 30-time code in the embodiment.

Here, signals in the aforethe phase 1 to phase 4 are shown in FIGS. 8 to 11, respectively. The 24-progressive signals in phases 1 to 4 are shown in FIGS. 8(*a*), 9(*a*), 10(*a*), and 11(*a*), respectively. The 24-time codes in phases 1 to 4 are shown in FIGS. 8(*b*), 9(*b*), 10(*b*), and 11(*b*), respectively. The counted values given by the counter 4 in phases 1 to 4 are shown in FIGS. 8(*c*), 9(*c*), 10(*c*), and 11(*c*), respectively. The 2-3 pulldown interlace signals in phases 1 to 4 are shown in FIGS. 8(*d*), 9(*d*), 10(*d*), and 11(*d*), respectively. The 30-time codes in phases 1 to 4 are shown in FIGS. 8(*e*), 9(*e*), 10(*e*), and 11(*e*), respectively.

If the generated 30-time code has a drop-frame period (hereinafter referred to as "DF"), the time code generator 6 performs the following process on the basis of a DF position setting command 16 that is input by the user. Here, the DF position setting command 16 is input into the time code generator 6 via an input device (not illustrated) such as a DF position setting button.

Figure 12:
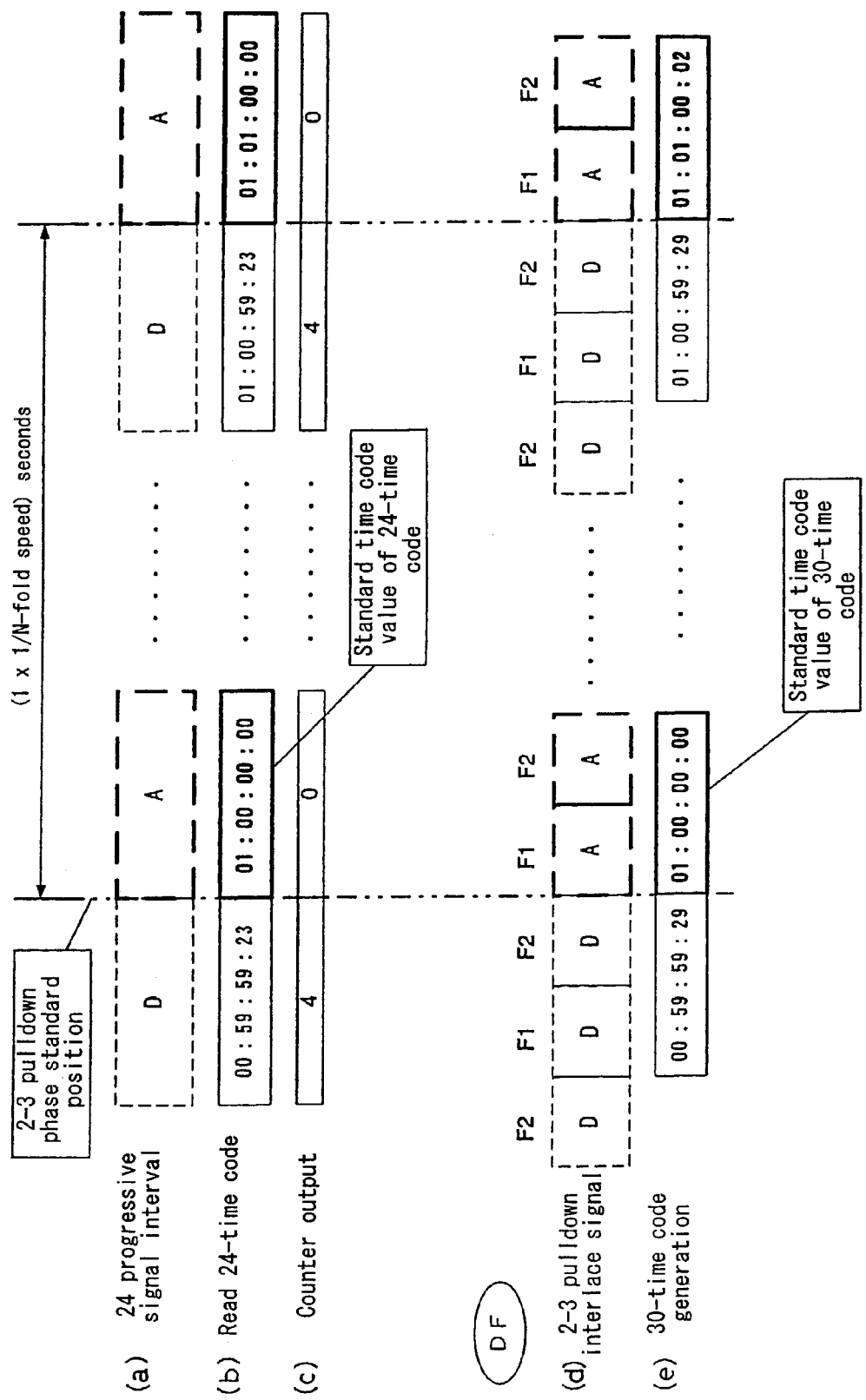
FIG. 12 is a view for describing generation of a drop-frame 30-time code in the embodiment.

When the DF position setting command 16 is input, the time code generator 6 determines a standard time code value corresponding to the 24-time code and the 30-time code, as shown in FIG. 12. Generally, in the time code of DF mode, with the determined standard time code value serving as a base point, the values before and after the base point will be successively shifted by two frames with an interval of one minute. In consideration of this, the time code generator 6 calculates the 30-time code value for every count of the frequency-quintupled signal. Specifically, described, the following process is carried out every one minute from the standard time code value, as shown in FIG. 12(*e*). Namely, the 24-time code is converted into a 30-time code in a state in which the time codes corresponding to the first frames of 00, 01 are deleted. This allows an accurate 30-time code of DF mode to be obtained.

Here, FIG. 12(*a*) shows a 24 progressive signal. FIG. 12(*b*) shows a 24-time code. FIG. 12(*c*) shows a counted value given by the counter 4. FIG. 12(*d*) shows a 2-3 pulldown interlace signal. FIG. 12(*e*) shows a 30-time code.

In the above-described specific examples, the 24 progressive phase standard position signal and the 24 progressive signal are recorded in the recording reproducing medium 1 in the image signal processing device. However, in the present invention, the process of recording the 24 progressive phase standard position signal and the 24 progressive signal into the recording reproducing medium 1 and the process of reproducing from the recording reproducing medium 1 for 2-3 pulldown conversion can be carried out in different image signal processing devices.

Figure 13:
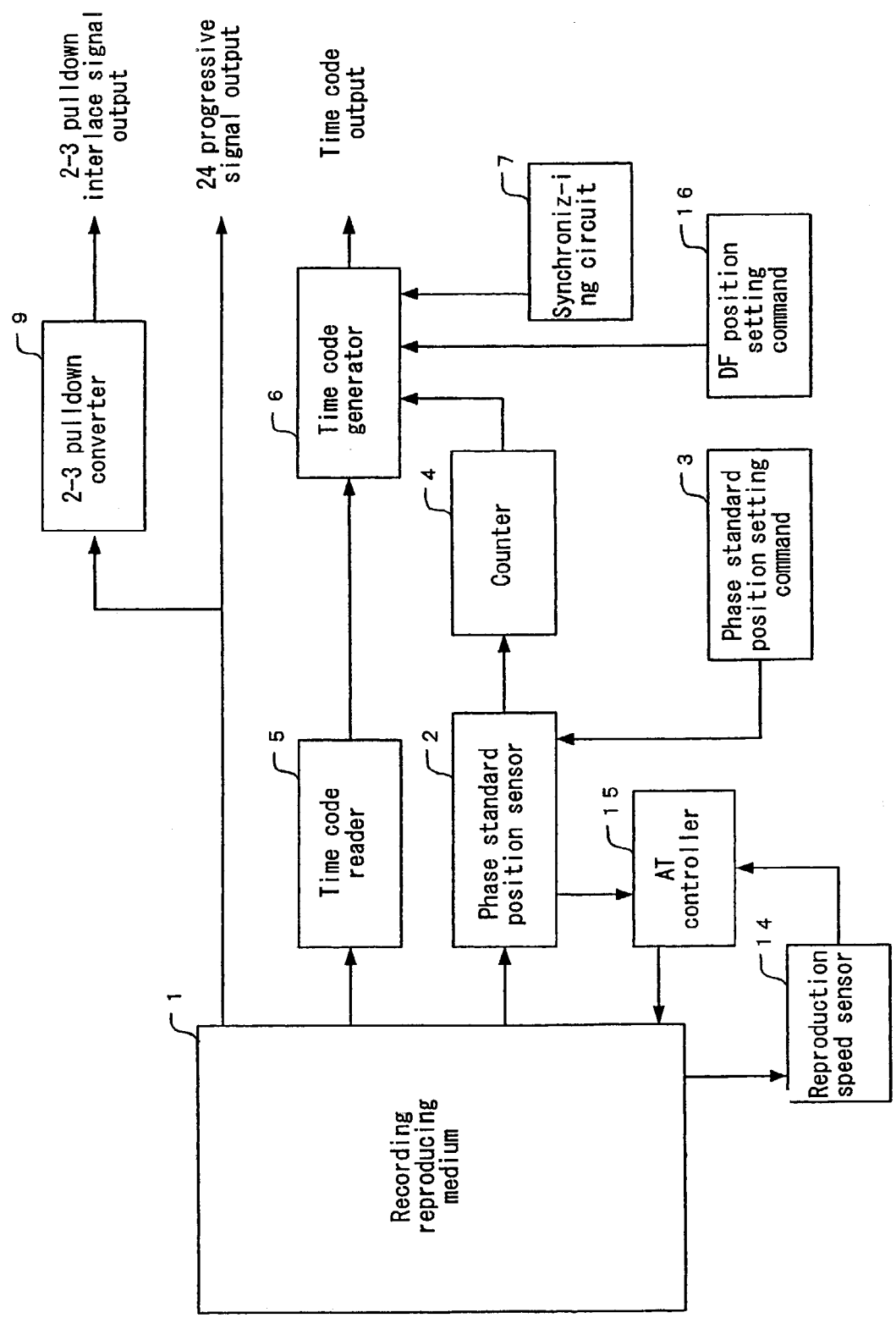
FIG. 13 is a block diagram illustrating an overall construction of another embodiment of the present invention.
Figure 14:
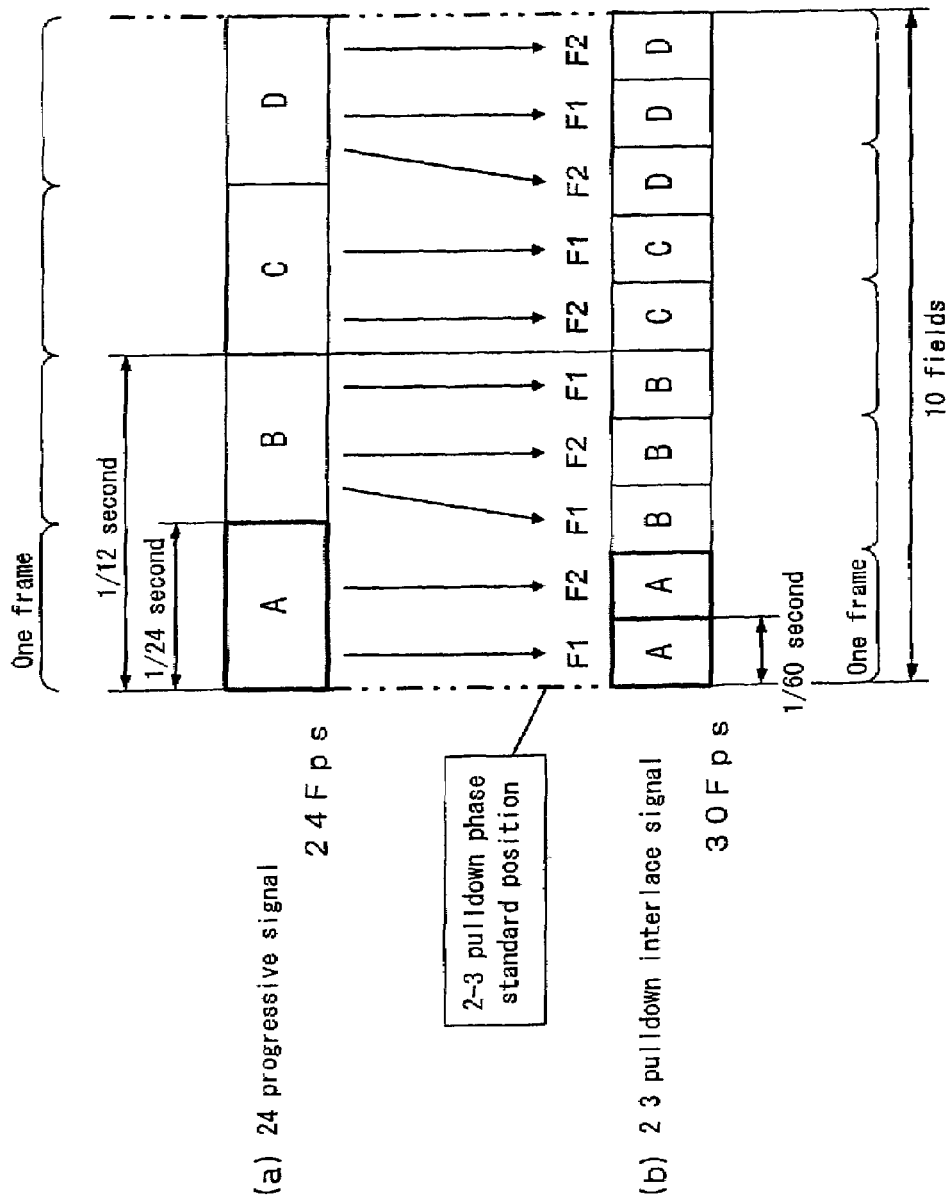
FIG. 14 is a view for describing the 2-3 pulldown conversion method.

A construction of a different image signal processing device that performs the process of reproducing from the recording reproducing medium 1 for 2-3 pulldown conversion is shown in FIG. 13. This image signal processing device has the same construction as the image signal processing device of FIG. 1 except that it does not have the recording-side component group including the phase standard position signal generator 8.

The above-described specific example is a specific example in which the present invention is carried out in an image signal processing device that converts a 24 progressive image signal into a 30 interlace image signal (2-3 pulldown interlace signal). In addition to this, the present invention can be carried out in the same manner in an image signal processing device that performs a 2-3 pulldown conversion process from a 24 progressive image signal into a 30 progressive image signal. In this case, the basic construction of the 24-time code and the basic construction of the 30-time code remain unchanged. For this reason, the construction of the image signal processing device of this case will be similar to the construction of the devices shown in FIGS. 1 and 13.

However, the construction of the 30 progressive image signal that has undergone the 2-3 pulldown conversion process is different from the construction of the aforethe 2-3 pulldown interlace signal. For this reason, the construction of the image signal that has undergone the 2-3 pulldown conversion process will have a progressive structure instead of the interlace structure shown in FIG. 3(*c*), FIG. 5(*f*), FIG. 8(*d*), FIG. 9(*d*), FIG. 10(*d*), FIG. 11(*d*), and FIG. 12(*d*). The specific example of this case is different from the above-described specific example only on this point.

Thus, according to the present invention, a time code of 24 Hz corresponding to a signal made of format images of 24 frames per one second of a movie film or the like can be converted with a high precision to generate a 30 Hz time code having a period of an interlace television image signal in ordinary-speed reproduction and in variable-speed reproduction.

While the invention has been described in detail with reference to the most preferable embodiments thereof, it is to be understood that the combinations and arrangements of the components in the preferable embodiments can be changed in various ways without departing from the spirit and scope of the present invention that will be hereinafter claimed.

What is claimed is:

1. An image signal processing device for generating and outputting a 30 Hz time code corresponding to an image signal of 30 frames/second format from a 24 Hz time code corresponding to an image signal of 24 frames/second format in reproducing the image signal from a recording reproducing medium having the image signal of 24 frames/second format recorded thereon, the image signal processing device comprising:

a phase standard position signal generator for generating a phase standard position signal of a predetermined period indicating a phase standard position of the image signal;

a recorder for recording the phase standard position signal into the recording reproducing medium;

a reproducer for reproducing the phase standard position signal from the recording reproducing medium;

a phase standard position sensor for sensing the phase standard position of the reproduced image signal on the basis of the phase standard position signal reproduced from the recording reproducing medium;

a counter for performing frequency multiplication of the phase standard position signal reproduced from the recording reproducing medium with the use of the phase standard position sensed by the phase standard position sensor as a base point, and for counting a period of the frequency-multiplied signal;

a time code reader for reading the 24 Hz time code recorded in the recording reproducing medium; and a time code generator for generating the 30 Hz time code on the basis of a counted value given by the counter and a 24 Hz time code value read by the time code reader.

2. The image signal processing device according to claim 1, wherein the reproducer, in variable-speed reproduction of the image signal, reproduces the phase standard position signal at the same reproduction speed as the variable-speed reproduction speed.

3. The image signal processing device according to claim 1, wherein
   the image signal of 30 frames/second format is obtained by 2-3 pulldown conversion of the image signal of 24 frames/second format,
   the predetermined period is a four-frame period of the image signal of 24 frames/second format, and
   the frequency-multiplied signal is a signal obtained by performing frequency quintuplication of the phase standard position signal reproduced from the recording reproducing medium.

4. The image signal processing device according to claim 1, wherein the phase standard position sensor further has a function of adjusting a phase of the phase standard position signal itself, and this phase adjustment function is a function of specifying the phase standard position of the reproduced image signal of 24 frames/second format by being performed on the basis of a selection operation of a user.

5. An image signal processing device for generating and outputting a 30 Hz time code corresponding to an image signal of 30 frames/second format from a 24 Hz time code corresponding to an image signal of 24 frames/second format in reproducing the image signal from a recording reproducing medium having the image signal of 24 frames/second format recorded thereon, the image signal processing device comprising:
   a reproducer for reproducing a phase standard position signal of a predetermined period recorded in the recording reproducing medium;
   a phase standard position sensor for sensing the phase standard position of the reproduced image signal on the basis of the phase standard position signal reproduced from the recording reproducing medium;
   a counter for performing frequency multiplication of the phase standard position signal reproduced from the recording reproducing medium with the use of the phase standard position sensed by the phase standard position sensor as a base point, and for counting a period of the frequency-multiplied signal;
   a time code reader for reading the 24 Hz time code recorded in the recording reproducing medium; and
   a time code generator for generating the 30 Hz time code on the basis of a counted value given by the counter and a 24 Hz time code value read by the time code reader.

6. The image signal processing device according to claim 5, wherein the reproducer, in variable-speed reproduction of the image signal, reproduces the phase standard position signal at the same reproduction speed as the variable-speed reproduction speed.

7. The image signal processing device according to claim 5, wherein
   the image signal of 30 frames/second format is obtained by 2-3 pulldown conversion of the image signal of 24 frames/second format,
   the predetermined period is a four-frame period of the image signal of 24 frames/second format, and
   the frequency-multiplied signal is a signal obtained by performing frequency quintuplication of the phase standard position signal reproduced from the recording reproducing medium.

8. The image signal processing device according to claim 5, wherein the phase standard position sensor further has a function of adjusting a phase of the phase standard position signal itself, and this phase adjustment function is a function of specifying the phase standard position of the reproduced image signal of 24 frames/second format by being performed on the basis of a selection operation of a user.

9. An image signal processing device for generating and outputting a 30 Hz time code corresponding to an interlace-form image signal of 30 frames/second format from a 24 Hz time code corresponding to a progressive-form image signal of 24 frames/second format in reproducing the image signal from a recording reproducing medium having the progressive-form image signal of 24 frames/second format recorded thereon, the image signal processing device comprising:
   a phase standard position signal generator for generating a phase standard position signal of a predetermined period indicating a phase standard position of the progressive-form image signal;
   a recorder for recording the phase standard position signal into the recording reproducing medium;
   a reproducer for reproducing the phase standard position signal from the recording reproducing medium;
   a phase standard position sensor for sensing the phase standard position of the reproduced progressive-form image signal on the basis of the phase standard position signal reproduced from the recording reproducing medium;
   a counter for performing frequency multiplication of the phase standard position signal reproduced from the recording reproducing medium with the use of the phase standard position sensed by the phase standard position sensor as a base point, and for counting a period of the frequency-multiplied signal;
   a time code reader for reading the 24 Hz time code recorded in the recording reproducing medium; and
   a time code generator for generating the 30 Hz time code on the basis of a counted value given by the counter and a 24 Hz time code value read by the time code reader.

10. The image signal processing device according to claim 9, wherein the reproducer, in variable-speed reproduction of the image signal, reproduces the phase standard position signal at the same reproduction speed as the variable-speed reproduction speed.

11. The image signal processing device according to claim 9, wherein
   the interlace-form image signal is obtained by 2-3 pulldown conversion of the progressive-form image signal,
   the predetermined period is a four-frame period of the progressive-form image signal, and
   the frequency-multiplied signal is a signal obtained by performing frequency quintuplication of the phase standard position signal reproduced from the recording reproducing medium.

12. The image signal processing device according to claim 9, wherein the phase standard position sensor further has a function of adjusting a phase of the phase standard position signal itself, and this phase adjustment function is a function of specifying the phase standard position of the reproduced progressive-form image signal by being performed on the basis of a selection operation of a user.

13. An image signal processing device for generating and outputting a 30 Hz time code corresponding to an interlace-form image signal of 30 frames/second format from a 24 Hz time code corresponding to a progressive-form image signal of 24 frames/second format in reproducing the image signal from a recording reproducing medium having the progressive-form image signal of 24 frames/second format recorded thereon, the image signal processing device comprising:

a reproducer for reproducing a phase standard position signal of a predetermined period recorded in the recording reproducing medium;

a phase standard position sensor for sensing the phase standard position of the reproduced progressive-form image signal on the basis of the phase standard position signal reproduced from the recording reproducing medium;

a counter for performing frequency multiplication of the phase standard position signal reproduced from the recording reproducing medium with the use of the phase standard position sensed by the phase standard position sensor as a base point, and for counting a period of the frequency-multiplied signal;

a time code reader for reading the 24 Hz time code recorded in the recording reproducing medium; and a time code generator for generating the 30 Hz time code on the basis of a counted value given by the counter and a 24 Hz time code value read by the time code reader.

14. The image signal processing device according to claim 13, wherein the reproducer, in variable-speed reproduction of the image signal, reproduces the phase standard position signal at the same reproduction speed as the variable-speed reproduction speed.

15. The image signal processing device according to claim 13, wherein the interlace-form image signal is obtained by 2-3 pull-down conversion of the progressive-form image signal, the predetermined period is a four-frame period of the progressive-form image signal, and the frequency-multiplied signal is a signal obtained by performing frequency quintuplication of the phase standard position signal reproduced from the recording reproducing medium.

16. The image signal processing device according to claim 13, wherein the phase standard position sensor further has a function of adjusting a phase of the phase standard position signal itself, and this phase adjustment function is a function of specifying the phase standard position of the reproduced progressive-form image signal by being performed on the basis of a selection operation of a user.

* * * * *